March 15, 1938.  C. C. BOYKIN  2,111,485
SEED PLANTER
Filed May 12, 1936  3 Sheets-Sheet 1
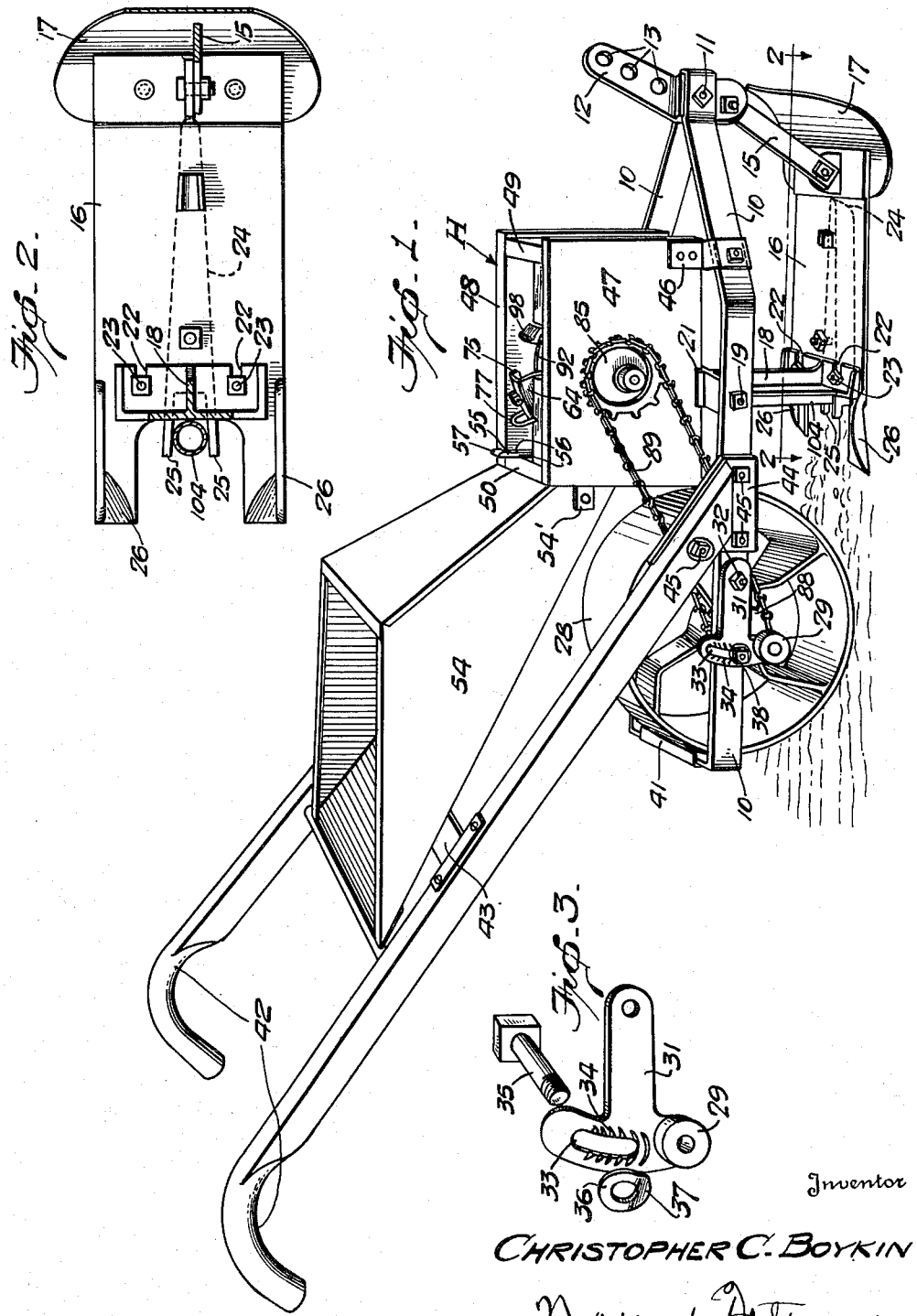
Inventor
CHRISTOPHER C. BOYKIN
By Norris & Bateman
Attorneys March 15, 1938.　　　　C. C. BOYKIN　　　　2,111,485
SEED PLANTER
Filed May 12, 1936　　　3 Sheets-Sheet 2
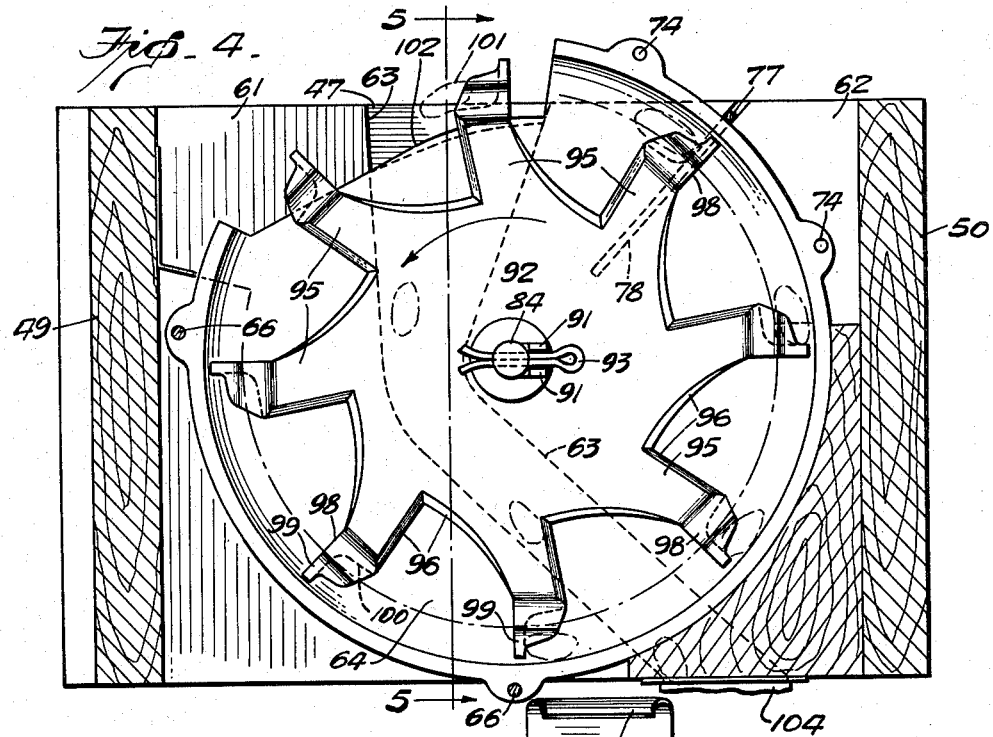
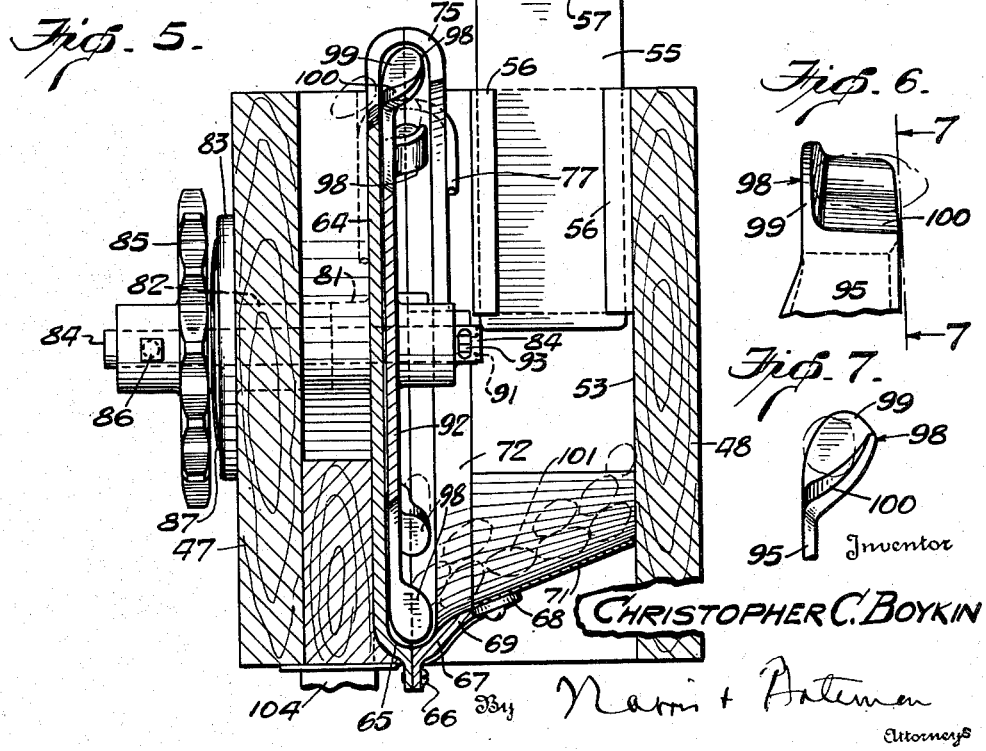
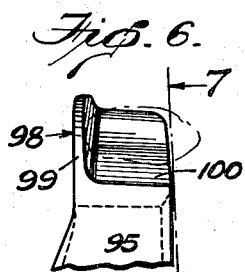
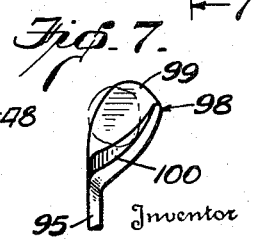
Inventor
CHRISTOPHER C. BOYKIN March 15, 1938. C. C. BOYKIN 2,111,485
SEED PLANTER
Filed May 12, 1936 3 Sheets-Sheet 3
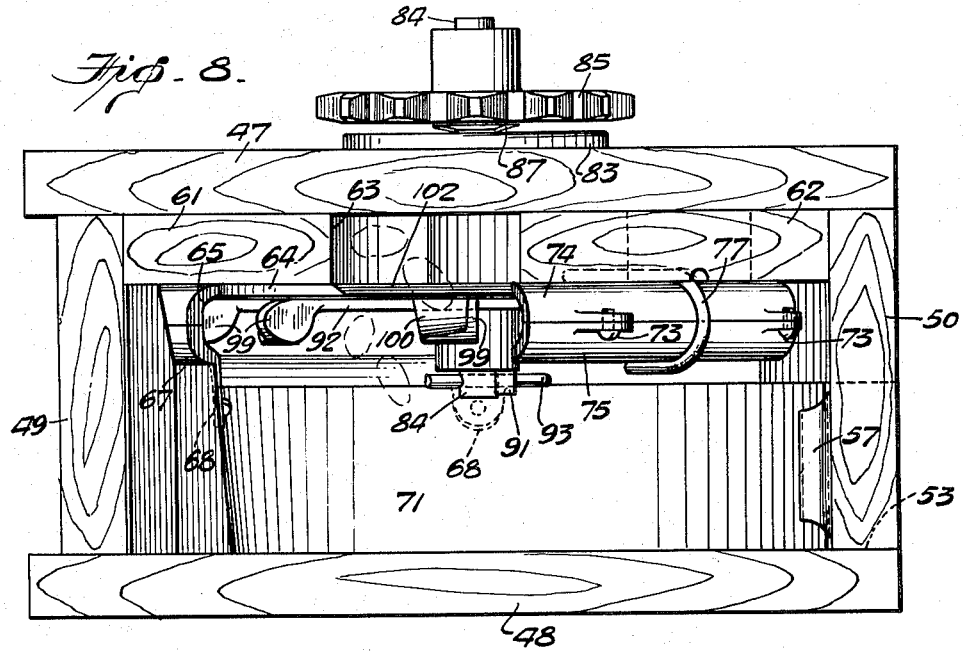
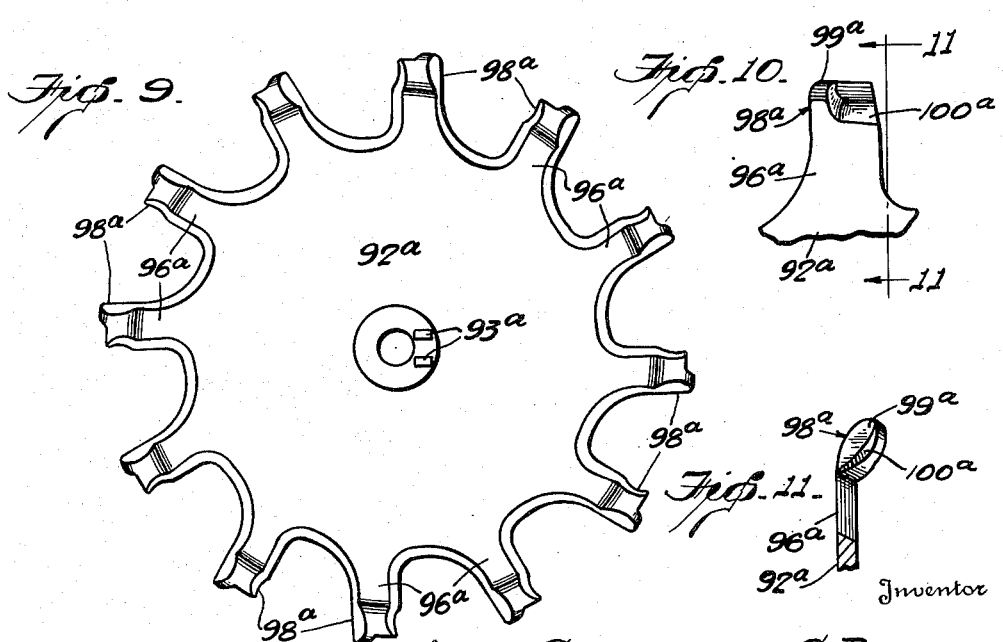
Inventor
CHRISTOPHER C. BOYKIN
By Narris + Bultiman
Attorneys Patented Mar. 15, 1938

2,111,485

UNITED STATES PATENT OFFICE 2,111,485

SEED PLANTER

Christopher C. Boykin, Norfolk, Va.

Application May 12, 1936, Serial No. 79,339

4 Claims. (Cl. 221—135)

The present invention relates to seed planting apparatus and it is more particularly concerned with seed planting apparatus of the character wherein the planter simultaneously produces a trench and deposits seeds therein at predetermined intervals as it is propelled over the ground.

In my Patent No. 1,879,055, granted September 27, 1932, I have disclosed a seed planter of this general character, and although that machine represents a considerable improvement over the prior art I have by the present invention provided a planter of simplified construction and widened application.

It is the primary object of my invention to provide a novel seed planting apparatus of simple yet rugged construction and which will efficiently plant seeds of various types.

My invention also aims to provide a seed planting device which will not jam or become clogged should extraneous material be supplied to it with the seed.

Another object is to provide a seed planting apparatus for handling seeds of various types and which is adjustable to plant the seed at the proper depth.

Further objects will become apparent as the specification proceeds in connection with the annexed drawings, and from the appended claims.

In the drawings:

Fig. 1 is a view in perspective of the seed planting apparatus of my invention;

Fig. 2 is a sectional view taken substantially on the line 2—2 of Fig. 1, looking in the direction of the arrows;

Fig. 3 is an exploded view in perspective illustrating the manner in which the wheel adjusting parts cooperate;

Fig. 4 is a longitudinal vertical sectional view of the seed feeding mechanism of my invention;

Fig. 5 is a sectional view taken substantially on the line 5—5 of Fig. 4, looking in the direction of the arrows;

Fig. 6 is a fragmental side elevational view of one of the seed propelling scoops of the feeding disc employed in the apparatus shown in Figure 5;

Fig. 7 is a view illustrating the way the scoop shown in Figure 6 appears when it is viewed on the line 7—7 of Fig. 6;

Fig. 8 is a top plan view of the seed feeding apparatus shown in Figures 1, 4 and 5;

Fig. 9 is a side elevational view of a modified form of seed feeding disc of my invention;

Fig. 10 is a side elevational view of one of the scoops of the disc of Figure 9, and Fig. 11 is a view taken on the line 11—11 of Figure 10.

With continued reference to the drawings, wherein like reference characters have been employed to designate like parts throughout the several views thereof, I have shown a planter having a frame or chassis defined by side members 10.

Secured to the front end of the side members 10, by a nut and bolt assembly 11, is a draft gear part 12 providing a plurality of holes 13 to which a draft attachment of any desired form may be connected. Secured to the lower end of part 12 by a strut 15 is the front end of a plate 16. Riveted to the front of plate 16 is a shoe member 17 which is adapted to ride over the ground and support the front part of the device.

The rear end of plate 16 is secured to the chassis by means of a standard 18 which is of T-form in section (Figure 2). The upper end of standard 18 is secured to side members 10 by means of nut and bolt assemblies 19 and its upper surface is provided with a pair of lugs 21 for positioning the feeding device thereon, to be hereinafter described.

The lower end of standard 18 is provided with a horizontal web in which a pair of slots 22 are formed. A pair of nut and bolt assemblies 23 cooperate with slots 22 to connect plate 16 to the standard. Provided on the lower face of plate 16 is a trench forming member 24, which terminates at its rear end in a pair of ears 25. Provided on the rear end of plate 16 are a pair of earth lifting members 26, which extend downward at the rear of the plate as seen in Figure 1. The lower face of each member 26 inclines upwardly toward the center of the device so as to throw the soil which is turned up by member 24 back into the trench and thereby cover the seed.

The rear end of the chassis is supported on a wheel 28 which is journalled in a pair of bearings 29 carried by a pair of arms 31. Arms 31 are secured to side members 10 by means of nuts and bolts 32 but are adapted to be adjusted vertically on the chassis. To this end, arms 31 are each provided with an arcuate slot 33 and a plurality of upwardly facing ratchet recesses 34. Cooperating with each arm 31 is a bolt 35 passing through an opening in side member 10 and through slot 33. A washer 36 having an offset portion 37 adapted to enter one of recesses 34 is placed over each bolt 35 and a nut 38 is turned on bolt 35 to firmly clamp the parts in assembled relationship.

By loosening nuts 38 arms 31 may be swung about bolts 32 as axes in order to locate wheel 28 in any desired vertically adjusted position. It is apparent that by raising wheel 28 more pressure will be applied to trench-forming member 24 with the result that the trench will be deeper than if the wheel is in a lower position. By lowering the wheel the trench can of course be made shallower. A scraper 41 is secured to the rear of the chassis for removing soil that might adhere to the wheel.

The device is adapted to be controlled by a pair of handles 42 which are interconnected by means of a cross bar 43 and which are secured to the chassis by means of plates 44 and nuts and bolts 45.

Mounted on the upper side of standard 18, and secured to the front end of the chassis by means of a pair of brackets 46 is a seed hopper H having a pair of side walls 47 and 48 and a pair of end walls 49 and 50. Hopper wall 50 is provided with a feed opening 53, and communicating therewith is the lower end of a seed supplying hopper 54 which is secured to hopper H by means of brackets 54' and handles 42 in any desired manner. Feed opening 53 is provided with a vertically movable gate 55, mounted in guides 56 and having a handle 57. Gate 55 may be raised or lowered to vary the size of opening 53 to thereby control the flow of seed to the interior of hopper H.

Secured to hopper wall 47 are a pair of blocks 61 and 62 which are spaced apart to define a seed discharge passage 63. Mounted in hopper H adjacent blocks 61 and 62 is a disc 64 having a vertical wall and a curved peripheral wall 65. Secured to peripheral wall 65 by means of a screw assembly 66 is a rim member 67 having two ears 68. Parts 65 and 67 define an inwardly facing seed guiding groove around the lower half of the periphery of the disc 64, and the lower portion of rim member 67 also provides a flaring surface portion 69 for feeding the seeds into the bottom of the groove. An inclined hopper bottom 71, secured to wall 48 and ears 68, is adapted to convey seeds from opening 53 to the seed groove.

Rim member 67 terminates in an upwardly facing surface 72. Removably mounted on the upper part of disc 64, by means of two pins 73 secured therein and fitting in apertures 74 in member 64 is an arcuate rim member 75. Rim member 75 which continues upwardly beyond the rim member 67, cooperates with disc 64 and rim member 67 to define a smooth, substantially closed seed guiding groove which extends around the lower edge of the disc 64 and partially across its upper edge. Rim member 75 is removably held in place in hopper H by means of a U-shaped spring member 77 embracing the upper part of the casing and having one leg frictionally seating in a groove 78 provided in block 62.

The seeds admitted to the bottom of the groove are adapted to be picked up and propelled upwardly one by one and discharged laterally from the hopper by the disc assembly that will now be described.

Disc 64 provides an integral bearing 81 which is recessed in block 62. Another bearing 82, having a flange 83, is secured to hopper wall 47. Journalled in bearings 81 and 82 is a shaft 84 having a sprocket 85 rigidly secured thereto by means of a set screw 86. Disposed between sprocket 85 and flange 83 is a leaf spring 87 which urges shaft 84 to the left (Figure 5) for a purpose that will presently appear. Shaft 84 is driven synchronously with wheel 28 by means of a sprocket 88 secured to the wheel shaft and a chain 89 passing over sprockets 85 and 88.

Mounted on shaft 84, and having a pair of driving lugs 91, is a seed propelling and lifting disc 92. A cotter pin 93 extends through an opening in shaft 84 and is disposed between lugs 91 to thereby positively couple disc 92 to the shaft.

Disc 92 is provided with a plurality of seed agitating spokes 95 having faces 96 which incline away from disc 64, so as to prevent extraneous material from becoming wedged therebetween. Each spoke terminates in a seed propelling and lifting scoop 98. Each scoop is provided with a wall 99 and an inclined surface 100.

Referring to Figures 4 and 5, a quantity of seeds designated at 101, are disposed in hopper H and by reason of the inclined bottom they tend to gravitate toward disc 64. When disc 92 is rotated counter clockwise (Figure 4) spokes 95 function as agitators and intimately mix the seeds and keep them constantly in motion, with the result that at least one seed is always disposed in the bottom of the groove in front of each scoop. As the disc rotates, wall 99 of the lowermost scoops propels seeds forwardly and upwardly in the groove. By reason of the fact that scoops 98 are so dimensioned as to contain but a single seed of a particular variety, when each scoop attains approximately the "two o'clock" position any excess seeds will drop back into the hopper.

The upper portion of disc 64 is cut away at 102 to provide a discharge zone and it will be observed that when each scoop attains its uppermost position there is a strong tendency for the seed contained therein to gravitate down inclined surface 100 toward disc 64. Therefore, when this position is attained the seeds will promptly gravitate over edge 102 into discharge passage 63.

Should the seed handled by the apparatus contain extraneous material, such as small pebbles, gravel and the like, it cannot become wedged between the parts and damage the machine because should it become lodged between discs 92 and 64, the latter may move to the right a limited distance against the action of leaf spring 87.

The seeds passing downwardly in passage 63 are introduced into a conduit 104 which is secured to the hopper and extends therebelow behind standard 18 and is retained in proper position by ears 25 formed on the latter.

When it is desired to handle a different variety of seed it is only necessary to replace disc 92 with a disc having the desired characteristics for the particular seed involved. This is effected by removing spring 77 and lifting away the upper section of the seed guiding casing, removing cotter pin 93, sliding shaft 84 to the left a slight distance (Figure 5) and removing disc 92 from shaft 84.

In Figures 9 and 10 I have illustrated another form of disc 92a adapted to handle smaller seeds and whose spokes 96a and scoops 98a are more closely spaced. Walls 99a and 100a of each scoop are moreover so designed as to provide a smaller scoop. This disc functions in precisely the same manner as the first described form of my invention.

I have accordingly provided a seed planter which is simple but rugged in design, will not readily get out of order, which will deliver a seed every time a scoop passes the discharge zone and only one, and which is so designed that it may be adjusted to handle various sized seeds.

What I claim is:—

1. In a seed planter, a hopper having an inclined bottom wall, a seed-guiding member of generally circular form disposed in said hopper and mounted with its lower edge below the lowermost portion of said inclined bottom wall, the marginal edge of said member curving back upon itself to provide an inwardly facing seed-guiding groove, a seed-advancing and feeding disc mounted for rotation in said hopper and disposed substantially parallel to and closely adjacent said seed-guiding member, means for rotating said disc, said disc terminating at its periphery in a plurality of comparatively long seed agitating arms between which the seeds from said inclined bottom wall are adapted to gravitate, each of said arms terminating in a seed advancing and lifting scoop, said scoops each being provided with a wall inclining inwardly toward said guiding member and a second wall facing toward the direction of rotation of the disc, said arms each extending a considerable distance inwardly of said scoops, whereby they function to thoroughly agitate the body of seeds in said hopper upon rotation of said disc, the upper portion of said seed-guiding member terminating inwardly of the path of travel of the inclined walls of said scoops to define a discharge point, said scoops being operable to slide seeds upwardly in the groove of said seed guiding member and discharge them over the upper edge of said seed-guiding member, means for conveying seeds away from said discharge point, and means for supplying seeds to said hopper.

2. The seed planter described in claim 1, wherein said seed-guiding member comprises two separable upper and lower sections for affording access to said seed advancing and feeding disc when said upper section is removed.

3. In a seed planting apparatus, a seed hopper, a substantially vertically disposed substantially circular plate mounted in said hopper and defining a circular, smooth seed-guiding surface, a shaft journalled in said hopper, a seed-feeding disc mounted on said shaft and having a plurality of seed propelling scoops at its periphery disposed in cooperating relationship with said seed-guiding surface, means for supplying seed to the lower part of said hopper, said scoops each having a wall tending to gravitate its seed toward said seed-guiding surface, said plate being provided with a recess in its upper portion to provide a discharge point, said recess extending downwardly to the path of travel of said walls of said scoops to allow the seeds to gravitate thereover, said disc being detachably mounted on said shaft and being removable from said hopper when said shaft is slid out of said disc, said plate being provided with an upper plate having an axially and inwardly curving flange which cooperates with said first named plate to provide an inwardly facing seed retaining groove, said upper plate having means for removably holding it in place in said hopper comprising a spring member which seats in a groove in a wall of said hopper and embraces said first named plate and said flange.

4. In a seed planting apparatus, a hollow housing, a substantially circular seed-guiding plate mounted substantially vertically in said housing, said housing having an inclined floor therein defining a hopper bottom and sloping toward the lower edge of said plate, a shaft journalled in a wall of said housing and projecting through said plate but terminating in said housing adjacent said plate, a disc-like seed propelling member mounted on said shaft and having means for detachably securing it thereto, said member having a plurality of arms radiating therefrom, each of said arms terminating in a seed lifting scoop, said scoops being operable to lift seeds from said hopper bottom to a discharge point in the upper part of said housing upon rotation of said shaft, said shaft being axially movable out of said housing upon release of said detachable securing means, and said disc-like member being freely removable vertically from said housing when said shaft is moved outwardly of the housing interior, the upper edge of said plate curving outwardly and away from the central portion thereof, and a plate element having a curvature corresponding to the curvature of the upper edge of said plate and having means for detachably securing it to the latter comprising a plurality of axially directed pins and a spring embracing said plate and plate element and fitting in a groove in said housing for restraining said plate elements against axial movement away from said plate.

CHRISTOPHER C. BOYKIN.